United States Patent Office 3,565,899
Patented Feb. 23, 1971

3,565,899
OXY-SUBSTITUTED BENZO QUINOLIZINIUM COMPOUNDS
Karl J. Doebel and Jeffrey W. H. Watthey, Ossining, N.Y., assignors to Geigy Chemical Corporation, Ardsley, N.Y., a corporation of New York
No Drawing. Continuation of application Ser. No. 685,316, Nov. 24, 1967, which is a continuation-in-part of application Ser. No. 603,418, Dec. 21, 1966, both now abandoned. This application Sept. 11, 1969, Ser. No. 857,658
Int. Cl. C07d 39/12
U.S. Cl. 260—286                        11 Claims

ABSTRACT OF THE DISCLOSURE (1) Benzo[b]quinolizinium compounds disubstituted in the 8,9- and 9,10-positions and trisubstituted in the 8,9,10-positions with hydroxy, lower alkanoxy and lower alkanoyloxy groups, and (2) lower alkyl and 11-amino substituted derivatives thereof are useful as cardiovascular agents, as agents affecting the central nervous system, and as antipyretic agents.

---

This application is a continuation of application S.N. 685,316, filed Nov. 24, 1967, which in turn is a continuation-in-part of application S.N. 603,418, filed Dec. 21, 1966, both now abandoned.

This invention relates to certain hydroxy-, alkanoxy- and alkanoyloxy-substituted benzo[b]quinolizinium compounds and derivatives thereof, to processes for their preparation, and to their uses. More particularly, this invention relates to 8,9- and 9,10-dihydroxy-, dialkanoxy- and dialkanoyloxybenzo[b]quinolizinium compounds, to 8,9,10-trihydroxy-, trialkanoxy- and trialkanoyloxybenzo[b]-quinolizinium compounds and to certain of their alkyl and amino substituted derivatives.

The compounds of this invention can be represented by the following general formula:

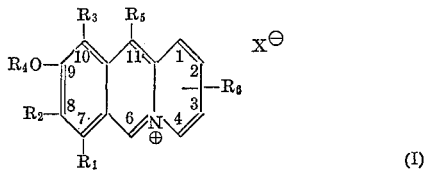

(I)

in which $R_1$ is hydrogen or lower alkyl,
at least one of $R_2$ and $R_3$ is hydroxy, lower alkanoxy, or lower alkanoyloxy, and the other of $R_2$ and $R_3$ is hydrogen, hydroxy, lower alkanoxy or lower alkanoyloxy,
$R_4$ is hydrogen, lower alkyl or lower alkanoyl,
$R_5$ is hydrogen, hydroxy or amino,
$R_6$ is hydrogen or lower alkyl, and
X is halogen, particularly chlorine or bromine, with the proviso
  (1) that if $R_1$, $R_3$ and $R_5$ are hydrogen, $R_2$ must be hydroxy or lower alkanoyloxy, and
  (2) that if $R_2$ or $R_3$ is hydroxy or if $R_4$ is hydrogen, $R_5$ must be hydrogen or hydroxy.

The term "lower alkyl" as used herein alone or in "lower alkanoxy" and "lower alkanoyloxy" means saturated monovalent aliphatic radicals of the general formula $C_mH_{2m+1}$ wherein $m$ represents an integer of 6 or less, and is inclusive of straight- and branched-chain groups such as methyl, ethyl, n-propyl, isopropyl, n-butyl, etc.

The compounds of this invention are pharmaceutically active agents. They are useful as cardiovascular agents, particularly for lowering blood pressure, as agents affecting the central nervous system, particularly as tranquilizers, and as antipyretic agents.

These compounds can be conveniently made from starting materials having the following structure:

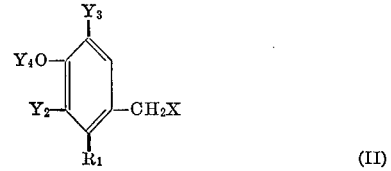

(II)

in which $R_1$ and X have the meaning ascribed to them in Formula I,
at least one of $Y_2$ and $Y_3$ is lower alkanoxy or lower alkanoyloxy and the other of $Y_2$ or $Y_3$ is hydrogen, lower alkanoxy or lower alkanoyloxy, and
$Y_4$ is lower alkyl or lower alkanoyl.

Compounds of this structure can be made by methods well known in the art from the corresponding aldehydes, carboxylic acids, esters, and alcohols, or by the known method of halomethylation of the appropriate benzene derivative. This starting compound is then quaternized with a 2-pyridinealdoxime to yield a salt consisting of a mixture of syn and anti isomers, having the following structure:

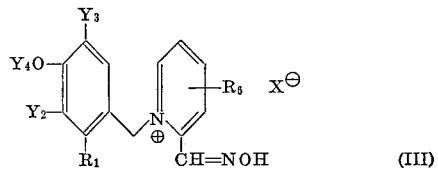

(III)

in which $R_1$, $R_6$, X, $Y_2$, $Y_3$, and $Y_4$ have the meanings ascribed to them in Formulae I and II above.

The quaternary salt intermediate is then cyclized with a concentrated halogen acid to yield principally a benzo[b]quinolizinium halide salt having the following structure:

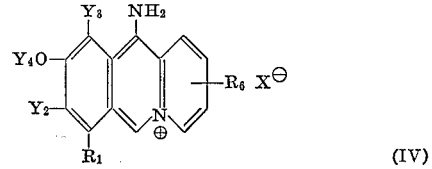

(IV)

and also smaller amounts of the 11-amino derivative

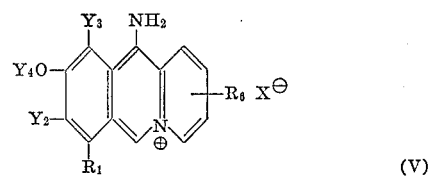

(V)

If hydroxy rather than lower alkanoxy or lower alkanoyloxy compounds are desired, compounds of Formulae IV and V can be hydrolyzed. To obtain the corresponding lower alkanoyloxy compound, the hydroxy compound is treated with an appropriate acylating agent. Thus, by this general method, all compounds encompassed by Formula I can be prepared.

As an alternative, a picolinic aldehyde may be used in the quaternization step instead of the 2-pyridinealdoxime. In this case, the cyclization step yields the benzo[b]quinolizinium halide unsubstituted in the 11-position.

To illustrate this process more specifically, the following is a brief description of the method of preparation of 9,10-dihydroxy-7-methylbenzo[b]quinolizinium bromide, and its dimethoxy-, 11-hydroxy-, 11-amino-, and diacetoxy analogs. The starting compound, 2-methyl-4,5-dimethoxy-benzyl bromide

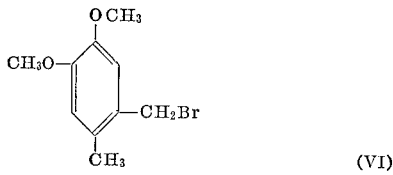
(VI)

can be conveniently prepared by bromomethylation of 3,4-dimethoxymethylbenzene using either bromomethyl ether or paraformaldehyde and aqueous hydrobromic acid. On quaternization with 2-pyridinealdoxime, 1-(4,5-dimethoxy-2-methyl)-benzyl-2-formylpyridinium bromide oxime

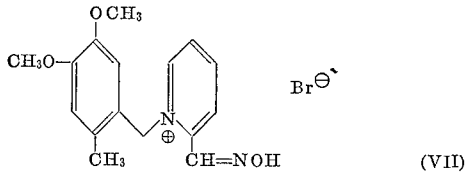
(VII)

is formed. This salt is then cyclized with hydrobromic acid to yield a mixture of 9,10-dimethoxy-7-methylbenzo[b]quinolizinium bromide

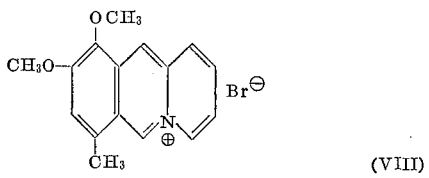
(VIII)

and 9,10-dimethoxy-11-amino-7-methylbenzo[b]quinolizinium bromide

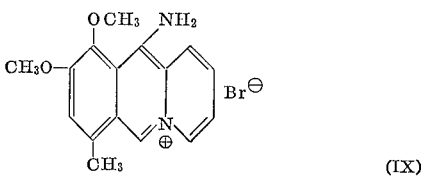
(IX)

which may be separated by fractional crystallization from ethanol. The compound of Formula VIII may then be hydrolyzed to yield 9,10-dihydroxy-7-methylbenzo[b]quinolizinium bromide

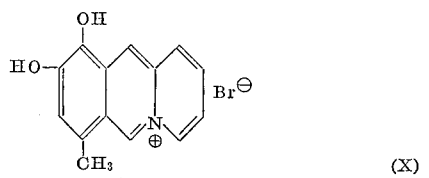
(X)

and the compound of Formula IX hydrolyzed to 9,10,11-trihydroxy-7-methylbenzo[b]quinolizinium bromide

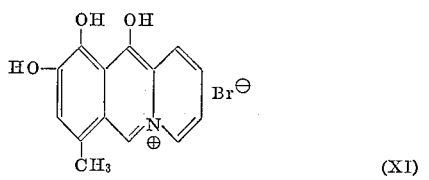
(XI)

The hydroxy compounds of Formulae X and XI can be treated with appropriate acylating agents, such as acetic anhydride, to obtain 9,10-diacetoxy-7-methylbenzo[b]quinolizinium bromide and 9,10,11-triacetoxy-7-methylbenzo[b]quinolizinium bromide, respectively.

The starting compound can be varied as necessary in order to produce the properly hydroxy-substituted end product desired. For example, if it is desired for the hydroxyl groups to be in the 8,9-positions, rather than in the 9,10-positions as shown in the specific illustration, the benzyl halide starting compound should be 3,4-dialkoxy substituted rather than 4,5-disubstituted.

Substitution in the 1-, 2-, 3-, or 4-positions may be achieved through the use of the appropriately substituted 2-pyridinealdoxime or picolinic aldehyde. Thus, the use of 4-methyl-2-pyridinealdoxime in the specific illustration above gives on quaternization and cyclization, the 2-methyl-substituted salt as illustrated below:

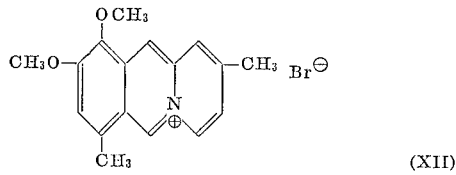
(XII)

A further alternate method of producing the benzo[b]quinolizinium compounds of this invention, unsubstituted in the 11-position, involves quaternization of an approprately lower alkanoyloxy-substituted benzyl halide with pyridine-2-aldehyde acetals and subsequent cyclization followed by hydrolysis to yield hydroxy compounds if desired. Thus, to obtain 9,10-dihydroxy-7-methylbenzo[b]quinolizinium bromide, the starting compound is 2-methyl-4,5-diacetoxybenzyl bromide.

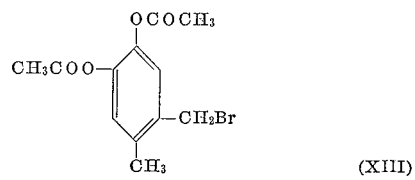
(XIII)

This is reacted with 2-(1,3-dioxolan-2-yl)pyridine to obtain 1-(4,5-diacetoxy-2-methyl)benzyl-2-(1,3-dioxolan-2-yl)-pyridinium bromide

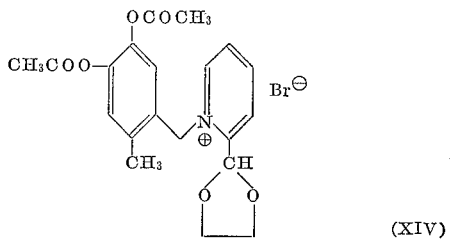
(XIV)

by a method described by D. L. Fields, J. B. Miller, and D. D. Reynolds, J. Org. Chem. 29, 2640 (1964). This salt is then cyclized with strong hydrobromic acid to yield 9,10-hydroxy-7-methylbenzo[b]quinolizinium bromide directly (Formula X).

It will, of course, be realized that by proper choice of starting materials, other hydroxy-substituted benzo[b]quinolizinium compounds of this invention can be prepared.

Other methods may be used to obtain quaternary salt intermediates analogous to those illustrated in Formulae III, VII and XIV. For example, salts of this type may be obtained by quaternization of the appropriately substituted benzyl halides with certain 2-substituted pyridine derivatives. More specifically, they may be obtained by quaternization of (1) alkoxybenzyl halides with 2-pyridinealdehyde acetals, (2) alkanoyloxybenzyl halides with 2-pyridinealdehyde semicarbazones and (3) alkanoyloxybenzyl halides with 2-pyridinealdoximes. Also useful are the quaternary salts obtained by reaction of alkoxy-substituted benzyl halides with 2-pyridinecarboxaldehyde semicarbazones and with substituted and unsubstituted hydrazones. For example, treatment of 1-(3,4-dimethoxy-2-methyl)benzyl-2-formylpyridinium bromide semicarbazone or phenylhydrazone with 48% hydrobromic acid for extended periods at 100° gave 8,9-dihydroxy-7-methylbenzo[b]quinolizinium bromide directly.

The present invention comprehends not only the indicated halide salts, but also other pharmaceutically acceptable nontoxic salts of these compounds formed by using the appropriate acid such as phosphoric or sulfuric, acetic, lactic, succinic, malic, phthalic, tartaric, pamoic and the like.

The compounds of the invention may be used in warm-blooded animals, particularly mammals, as medicaments in the form of pharmaceutical compositions containing the compounds in admixture or conjunction with a pharmaceutical organic or inorganic, solid or liquid carrier for oral, rectal, or parenteral administration. The total daily doses can vary from about 0.1 mg./kg. to about 10 mg./kg. preferably about 0.5 mg./kg. to 5 mg./kg.

The preferred route of administration is the oral route. Suitable compositions include, without limitation, tablets, capsules, powders, solutions, suspensions, sustained release formulations and the like.

To produce dosage units for peroral application, the compositions of this invention may be combined, e.g., with solid pharmaceutically acceptable pulverulent carriers such as lactose, saccharose, sorbitol, mannitol; starches such as potato starch, corn starch or amylopectin, also laminaria powder or citrus pulp powder, cellulose derivatives or gelatin, also lubricants such as magnesium or calcium stearate or polyethylene glycols of suitable molecular weights may be added, to form tablets or press coated tablets. The latter are coated for example, with concentrated sugar solutions which can contain e.g., gum arabic talcum and/or titanium dioxide, or they are coated with lacquer dissolved in easily volatile organic solvents or a mixture of organic solvents. Dyestuffs can be added to these coatings, for example, to distinguish between different contents of active substances.

Hard gelatin capsules contain, for example, granulates of the instant composition with solid pulverulent carriers such as, e.g., lactose, saccharose, sorbitol, mannitol and further starches such as potato starch, corn starch or amylopectin, cellulose derivatives or gelatin, as well as magnesium stearate or stearic acid.

Suppositories containing a compound of the present invention are readily obtained by techniques well known to those skilled in the art of compounding dosage forms. A compound of the present invention is dispersed in a carrier such as cocoa butter and the suppositories formed in the usual way.

The compounds of this invention and the intermediates obtained in their preparation are more fully illustrated by the following examples, which also show the method of preparing the starting compounds. These examples are included here for the purpose of illustration and are not intended as a limitation. All temperatures are in degrees centigrade.

EXAMPLE 1

Preparation of 8,9-dimethoxy-7-methylbenzo[b]quinolizinium bromide via 1-(3,4-dimethoxy-2-methyl)benzyl-2-formylpyridinium bromide oxime (a) Monobromomethylmethyl ether.—A mixture of methanol (945 g.) and 40% aqueous formaldehyde (500 ml.) was cooled to $-10°$ and saturated with hydrogen bromide. The two phases were separated and the lower layer distilled. After a forerun, 242 g. of the product, B.P. 86–88°, was collected.

(b) 3,4-dimethoxy-2-methylbenzyl bromide (Method A).—A mixture of 2,3-dimethoxytoluene (80 g.), monobromomethylmethyl ether (137 g.) and glacial acetic acid (88 ml.) was maintained at 30° for 8 hours. The reaction mixture was poured into ice-water and the resulting solid filtered off. Recrystallization from hexane gave 73 g. of the product as colorless platelets; M.P. 66–68°.

Analysis.—Calc'd for $C_{10}H_{13}BrO_2$ (percent): C, 49.00; H, 5.35; Br, 32.39. Found (percent): C, 48.97; H, 5.40; Br, 32.39.

(Method B).—A mixture of 2,3-dimethoxytoluene (91 g.), paraformaldehyde (20 g.), 48% hydrobromic acid (68.5 ml.), and benzene (300 ml.) was cooled to 0° with stirring and was saturated with hydrogen bromide with ice cooling. The organic phase was separated, washed with saturated brine, dried over anhydrous magnesium sulfate and the solvent removed under reduced pressure to give the crude benzylbromide (124 g.). One recrystallization from petroleum ether (B.P. 30–60°) gave the benzyl bromide (95 g.; M.P. 68–70°). A further recrystallization raised the M.P. to 70–72°.

(c) 1 - (3,4 - dimethoxy - 2-methyl)benzyl-2-formylpyridinum bromide oxime.—3,4 - dimethoxy-2-methylbenzyl bromide (54 g.) and 2-pyridinealdoxime (27 g.) were dissolved in dimethylformamide (162 ml.) and the solution was maintained at 30° for 18 hours. The crystalline product was removed by filtration and the filtrate poured slowly into ethyl acetate (2000 ml.) with stirring. The resulting amorphous solid was filtered off and combined with the crystalline material to give a total yield of 74 g. of the quaternary salt which was used without purification for the next step of the synthesis. Two recrystallizations from methanol gave the pure material as colorless crystals: M.P. 166.5–168°.

Analysis.—Calc'd for $C_{16}H_{19}BrN_2O_3$ (percent): C, 52.32; H, 5.22; N, 7.63; Br, 21.76. Found (percent): C, 52.32; H, 5.22; N, 7.63; Br, 21.49.

(d) 8,9 - dimethoxy - 7 - methylbenzo[b]quinolizinum bromide. 1 - (3,4 - dimethoxy-2-methyl)benzyl-2-formylpyridinium bromide oxime (50 g.) was dissolved in 48% hydrobromic acid (125 ml.) previously heated to 110° and the solution was maintained at that temperature for 5 min. The solution was poured into tetrahydrofuran (2000 ml.) with stirring and the stirring was maintained for a further 18 hours. Filtration gave 28 g. of the product as yellow platelets. Five recrystallizations from ethanol gave 11.5 g. of pure material, M.P. 222.5–224.5°.

Analysis.—Calc'd for $C_{16}H_{16}BrNO_2$ (percent): C, 57.49; H, 4.83; N, 4.18; Br, 23.92. Found (percent): C, 57.54; H, 4.82; N, 4.26; Br, 23.83.

EXAMPLE 2

Preparation of 8,9-dimethoxy-7-methylbenzo[b]quinozinium bromide via 1-(3,4-dimethoxy-2-methyl)benzyl-2-formylpyridinium bromide (a) 1-(3,4-dimethoxy - 2 - methylbenzyl-2-formylpyridinium bromide.—A solution of 2-pyridinecarboxaldehyde (5.35 g.: freshly redistilled) and 3,4-dimethoxy-2-methylbenzyl bromide (12.5 g.: prepared according to Method A given in Example 1 (b)) in dimethylformamide (30 ml.) was maintained at room temperature for 18 hours under an atmosphere of nitrogen. The reaction mixture was poured slowly with stirring into ethyl acetate (800 ml.) and the resulting yellow precipitate was filtered off to give the quaternary salt (13.2 g.: M.P. 111–112°), used without purification for the next step.

(b) 8,9-dimethoxy - 7 - methylbenzo[b]quinolizinium bromide.—1-(3,4 - dimethoxy-2-methylbenzyl)-2-formylpyridinium bromide (2.5 g.) was dissolved in 48% hydrobromic acid (7.5 ml.) previously heated to 98°, and the solution was maintained at that temperature for 8 minutes. The reaction mixture was poured into tetrahydrofuran (100 ml.) with stirring. The resulting yellow precipitate was filtered off (1.3 g.; M.P. 211–213°) identified as authentic 8,9-dimethoxy-7-methylbenzo[b]quinolizinium bromide by I.R. spectroscopy and thin layer chromatography (2 developing systems).

EXAMPLE 3

Preparation of 8,9 - dimethoxy-7-methylbenzo[b]quinolizinium bromide via 1-(3,4-dimethoxy-2-methyl)benzyl-2-formylpyridinium bromide ethylene acetal (a) 1-(3,4 - dimethoxy-2-methyl)benzyl-2-formylpyridinium bromide ethyleneacetal.—A solution of 2-pyridinecarboxyaldehyde ethyleneacetal (1.9 g.) and 3,4-dimethoxy-2-methylbenzylbromide (3.1 g.; prepared according to Method A given in Example 1 (b)) in dimethylformamide (10 ml.: freshly dried by passage through a column of molecular sieve, activated, "Linde" type 13X, ⅛″) was maintained at room temperature for 18 hours and then poured slowly with stirring into ethyl acetate (500 ml.). The resulting precipitate was filtered off to give the quaternary salt (3.0 g.; M.P. 125–127°) used without purification for the next step.

(b) 8,9-dimethoxy - 7 - methylbenzo[b]quinolizinium bromide.—1-(3,4-dimethoxy - 2-methyl)benzyl-2-formylpyridinium bromide ethyleneacetal (1.1 g.) was dissolved in 48% hydrobromic acid (2.6 ml.) previously heated to 110°, and the solution was maintained at that temperature for 8 minutes. The reaction mixture was poured into tetrahydrofuran (40 ml.) with stirring and the resulting yellow precipitate was filtered off (0.7 g.; M.P. 218–224.5°) and identified as authentic 8,9-dimethoxy-7-methylbenzo[b]quinolizinium bromide by I.R. spectroscopy and thin layer chromatography (two developing systems).

EXAMPLE 4

11-amino-8,9-dimethoxy-7-methylbenzo[b] quinolizinium bromide

1 - (3,4-dimethoxy-2-methylbenzyl)-2-formylpyridinium bromide oxime (87.6 g.) was dissolved in 48% hydrobromic acid (205 ml.) heated on the steam bath. The resulting solution was poured into tetrahydrofuran (4100 ml.) with stirring and the stirring was maintained for a further 18 hours. Filtration gave 64.2 g. of the crude product which was extracted with 2 x 4 liter portions of boiling ethanol. The resulting ethanol solutions deposited a total of 5.4 g. of crystalline material on cooling and this was combined with the residue from the ethanol extractions (2.4 g.). The combined material was recrystallized twice from ethanol and once from dimethylsulfoxide to yield 1.2 g. of the pure product, M.P. 263–263.5°.

Analysis.—Calc'd for $C_{16}H_{17}BrN_2O_2$ (percent): C, 55.02; H, 4.91; N, 8.02; Br, 22.88. Found (percent): C, 54.82; H, 4.88; N, 7.86; Br, 22.90.

EXAMPLE 5

Preparation of 8,9-dihydroxy - 7 - methylbenzo[b]quinolizinium bromide via 8,9-dimethoxy-7-methylbenzo[b] quinolizinium bromide A mixture of 8,9-dimethoxy-7-methylbenzo[b]quinolizinium bromide, prepared according to the method of Example 1, and 48% hydrobromic acid (20 ml.) was refluxed for 3 hours and the reaction mixture cooled to room temperature. The product was filtered off and recrystallized twice from dilute hydrobromic acid to give 1.4 g. of the product as yellow needles, M.P. 305–310° dec.

Analysis.—Calc'd for $C_{14}H_{12}BrNO_2$ (percent): C, 54.92; H, 3.95; N, 4.58; Br, 26.11. Found (percent): C, 55.03; H, 4.05; N, 4.72; Br, 25.89.

EXAMPLE 6

Preparation of 8,9 - dihydroxy - 7 - methylbenzo[b]quinolizinium bromide via 1-(3,4-dimethoxy-2-methyl)benzyl-2-formylpyridinium bromide semicarbazone (a) 1-(3,4 - dimethoxy-2-methyl)benzyl-2-formylpyridinium bromide semicarbazone.—Semicarbazide hydrochloride (0.8 g.) was dissolved in methanol (100 ml.) and potassium carbonate (0.5 g.) was added. The solution was filtered and the semicarbazide solution was cooled to room temperature. 1-(3,4-dimethoxy-2-methyl)benzyl-2-formylpyridinium bromide (2.0 g.: prepared according to the method of Example 2 (a)) was dissolved in methanol (50 ml.) and added to the methanolic semicarbazide. The reaction mixture was stirred at room temperature for 18 hours and then poured into ether (1000 ml.). The resulting precipitate (2.7 g.) was filtered off and recrystallized from methanol/ethyl acetate to give the quaternary salt (0.2 g.: M.P. 178–178.5°) together with 1.7 g. of less pure material.

(b) 8,9-dihydroxy-7-methylbenzo[b]quinolizinium bromide.—A solution of 1-(3,4-dimethoxy-2-methyl)benzyl-2-formylpyridinium bromide semicarbazone (0.05 g.; M.P. 178–178.5°) in 48% hydrobromic acid (1.2 ml.) was maintained at 100° for 4½ hours. A yellow precipitate formed. The reaction mixture was poured into tetrahydrofuran (8 ml.) and the yellow precipitate filtered off (0.03 g.; M.P. 305–308° dec.) and identified as authentic 8,9-dihydroxy-7-methylbenzo[b]quinolizinium bromide by I.R. spectroscopy and thin layer chromatography (2 developing systems).

EXAMPLE 7

Preparation of 8,9-dihydroxy-7-methylbenzo[b]quinolizinium bromide via 1-(3,4-dimethoxy-2-methyl)benzyl-2-formylpyridinium bromide phenylhydrazone (a) 1 - (3,4 - dimethoxy - 2 - methyl)benzyl - 2-formylpyridinium bromide phenylhydrazone.—A solution of 3,4-dimethoxy-2-methylbenzyl bromide (12.2 g. prepared according to Method A given in Example 1 (b)) and 2-pyridinecarboxaldehyde phenylhydrazone (9.8 g.) in dimethylformamide (15 ml.) was maintained at room temperature for 18 hours. The resulting precipitate was filtered off and the filtrate poured slowly with stirring into ethyl acetate (800 ml.). The solid which was deposited was filtered off, recrystallized from isopropanol, and then stirred with water (50 ml.) for 3 hours. The residual solid (3.4 g.) was filtered off, dried and used without further purification.

(b) 8,9-dihydroxy - 7 - methylbenzo[b]quinolizinium bromide.—A solution of 1 - (3,4-dimethoxy - 2 - methyl)benzyl - 2 - formylpyridinium bromide phenylhydrazone (0.61 g.) in 48% hydrobromic acid (2.5 ml.) was maintained at 100–110° for four hours. The resulting precipitate was filtered off (0.30 g.) and recrystallized from dilute hydrobromic acid to give 8,9 - dihydroxy - 7 - methylbenzo[b]quinolizinium bromide (0.20 g.) M.P. 304–307° dec. identified by comparison with authentic material by I.R. spectroscopy and thin layer chromatography.

EXAMPLE 8

8,9-diacetoxy-7-methylbenzo[b]quinolizinium bromide 8,9 - dihydroxy - 7 - methylbenzo[b]quinolizinium bromide (5.0 g.), prepared according to the method of Example 3, and sodium hydroxide (2.0 g.) were dissolved in water (19.3 ml.) and 16 g. of crushed ice was added, followed by acetic anhydride (4.25 g.). The solution was made strongly acid with 48% hydrobromic acid and the resulting crystalline precipitate was filtered off. Two recrystallizations from methanol gave the pure diacetate (1.70 g.) as yellow crystals, M.P. 265–270°.

Analysis.—Calc'd for $C_{18}H_{16}BrNO_4$ (percent): C, 55.40; H, 4.14; N, 3.59; Br, 20.48. Found (percent) C, 55.40; H, 3.96; N, 3.77; Br, 20.27.

EXAMPLE 9

8,9-dimethoxy-4,7-dimethylbenzo[b]quinolizinium bromide (a) 1 - (3,4 - dimethoxy - 2 - methyl)benzeyl - 6-methyl - 2 - formylpyridinium bromide oxime.—3,4 - dimethoxy - 2 - methyl benzyl bromide (12.5 g.) and 6-methyl - 2 - pyridinealdoxime (7.0 g.) were dissolved in dimethylformamide (40 ml.) and the solution was maintained at 30° for 18 hours. The reaction mixture was poured slowly into ethyl acetate (500 ml.) with stirring. The resulting precipitate was filtered off (5.20 g.) and used without purification for the next step of the synthesis.

(b) 8,9 - dimethoxy - 4,7 - dimethylbenzo[b]quinolizinium bromide.—1 - (3,4 - dimethoxy - 2 - methyl)benzyl - 6 - methyl - 2 - formyl pyridinium bromide oxime (4.70 g.) was dissolved in 48% hydrobromic acid (11.8 ml.) previously heated to 110°, and the solution was maintained at that temperature for 5 minutes. The solution was then poured into tetrahydrofuran (250 ml.)

with stirring and the stirring maintained for a further 18 hours. Filtration gave 1.4 g. of the product. Two recrystallizations from ethanol yielded orange crystals, M.P. 212–212.5°.

EXAMPLE 10

11-amino-8,9-dimethoxybenzo[b]quinolizinium bromide (a) 3,4 - dimethoxybenzyl bromide.—3,4 - dimethoxybenzyl alcohol (53.2 g.) was dissolved in dry benzene (485 ml.) and the solution was cooled to —10°. The solution was saturated with hydrogen bromide while stirring was maintained. The reaction mixture was neutralized with anhydrous potassium carbonate and the solvent removed on the rotary evaporator to give 67.2 g. of the crude bromide, used without purification for the next step of the synthesis.

(b) 1 - (3,4 - dimethoxy)benzyl - 2 - formylpyridinium bromide oxime.—3,4 - dimethoxybenzyl bromide (67 g.) and 2 - pyridinealdoxime (35.5 g.) were dissolved in dimethylformamide (153 ml.) and the solution was maintained at 30° for 18 hours. The crystalline product was filtered off and the filtrate was poured slowly into ethyl acetate (3000 ml.) with stirring. The resulting amorphous precipitate was filtered off and combined with the crystalline material to give a yield of 87.5 g. of the crude salt used without purification for the next step of the synthesis. Two recrystallizations from methanol gave the pure salt, M.P. 168–171.5° as pale yellow crystals.

Analysis.—Calc'd for $C_{15}H_{17}BrN_2O_3$ (percent): C, 50.99; H, 4.85; N, 7.93; Br, 22.63. Found (percent): C, 51.29; H, 4.96; N, 7.86; Br, 22.51.

(c) 11 - amino - 8,9 - dimethoxybenzo[b]quinolizinium bromide. 1 - (3,4 - dimethoxybenzyl - 2 - formylpyridinium bromide oxime (74.3 g.) was dissolved in 48% hydrobromic acid (186 ml.) heated on the steam bath. The resulting solution was poured into tetrahydrofuran (3700 ml.) and the stirring was maintained for a further 18 hours. Filtration gave 62.4 g. of the crude product which was extracted with 2 x 3 liter portions of boiling ethanol. The resulting ethanol solutions deposited a total of 8.4 g. of crystalline material on cooling and this was combined with the residue from the ethanol extractions (1.4 g.). The combined material was recrystallized twice from ethanol to give 3.92 g. of the pure amino compound as yellow crystals, M.P. 267–267.5°.

Analysis.—Calc'd for $C_{15}H_{15}BrN_2O_2$ (percent): C, 53.75; H, 4.51; N, 8.36; Br, 23.84. Found (percent): C, 53.85; H, 4.45; N, 8.66; Br, 23.67.

EXAMPLE 11

8,9,11-trihydroxybenzo[b]quinolizinium bromide

11 - amino - 8,9 - dimethoxybenzo[b]quinolizinium bromide (2.92 g.) was dissolved in 48% hydrobromic acid (12 ml.) and the solution was refluxed for 3 hours. The reaction mixture was cooled to room temperature, and the product filtered off and recrystallized twice from dilute hydrobromic acid to give 1.2 g. of yellow crystals, M.P. >350°.

Analysis.—Calc'd for $C_{13}H_{10}BrNO_3$ (percent): C, 50.67; H, 3.27; N, 4.55. Found (percent): C, 50.56; H, 3.70; N, 4.64.

EXAMPLE 12

8,9-dihydroxybenzo[b]quinolizinium chloride

A mixture of 3,4-dimethoxybenzyl bromide (20.1 g.), pyridine-2-carboxaldehyde (10.05 g.) and dimethylformamide (2.5 ml.) was maintained at room temperature for 24 hours. The resulting glassy mass was washed with ether. Concentrated hydrochloric acid (100 ml.) was then added, and the mixture was kept at 100° for two hours. The reaction mixture was cooled to room temperature, and the resulting crystalline precipitate was filtered off. This material was taken up in water and passed through a column of Amberlite IRA 400 (chloride form). The solution was evaporated to dryness to give 3.91 g. of crude 8,9-dimethoxybenzo[b]quinolizinium chloride.

A mixture of 8,9-dimethoxybenzo[b]quinolizinium chloride (3.7 g.) and concentrated hydrochloric acid (50 ml.) was refluxed for 18 hours. The reaction mixture was cooled to room temperature and the resulting crystalline precipitate was filtered off, recrystallized twice from dilute hydrochloric acid and once from methanol to give 520 mg. of yellow crystals, M.P. >350°.

EXAMPLE 13

11-amino-9,10-dimethoxy-7-methylbenzo[b]quinolizinium bromide (a) 4,5-dimethoxy-2-methylbenzyl bromide (Method A).—A mixture of 3,4-dimethoxytoluene (10 g.), glacial acetic acid (11 g.) and monobromomethylmethyl ether (17 g.) was maintained at 30° for 5 hours. The reaction mixture was poured into ice-water, the mixture extracted with ether, and the ether dried over anhydrous magnesium sulfate and evaporated under reduced pressure to give 15 g. of the desired product as a straw colored oil, used without purification for the next step of the synthesis.

(Method B).—A mixture of 3,4-dimethoxytoluene (182 g.), paraformaldehyde (40 g.), benzene (600 ml.) and 48% hydrobromic acid (137 ml.) was cooled to 0° and saturated with hydrogen bromide with ice cooling. The phases were separated and the organic layer was washed with saturated brine and dried over anhydrous magnesium sulfate. On evaporation of the solvent, the product was obtained as a semicrystalline mass (175 g.). Recrystallization from hexane gave material of M.P. 31.5–33°.

(b) 1-(4,5-dimethoxy - 2 - methyl)benzyl-2-formylpyridinium bromide oxime.—4,5-dimethoxy-2-methylbenzyl bromide (12.5 g.) and 2-pyridinealdoxime (6.3 g.) were dissolved in dimethylformamide (32 ml.) and the solution was maintained at 30° for 18 hours. The crystalline product was filtered off and the filtrate poured slowly into ethyl acetate (500 ml.) with stirring. The resulting amorphous solid was filtered off and combined with the crystalline material to give a total yield of 14.3 g. of the quaternary salt, used without purification for the next step of the synthesis. Two recrystallizations from methanol gave the pure material as colorless crystals, M.P. 178.5–181°.

Analysis.—Calc'd for $C_{16}H_{19}BrN_2O_3$ (percent): C, 52.32; H, 5.22; N, 7.63; Br, 21.76. Found (percent): C, 52.14; H, 5.24; N, 7.43; Br, 22.01.

(c) 11 - amino - 9,10 - dimethoxy - 7 - methylbenzo[b]quinolizinium bromide.—1-(4,5 - dimethoxy - 2 - methyl)benzyl-2-formylpyridinium bromide oxime (114 g.) was dissolved in 48% hydrobromic acid (270 ml.) and heated on the steam bath. The resulting solution was poured into tetrahydrofuran (8000 ml. in two batches) and the stirring was maintained for a further 18 hours. Filtration gave 84 g. of the crude product which was extracted with 3 x 4 liter portions of boiling ethanol. The resulting ethanol solutions were reduced in volume to 9 liters and deposited 24 g. of crystalline material on cooling. Three recrystallizations from ethanol gave 400 mg. of the amino compound, M.P. 264–265°, as orange crystals.

EXAMPLE 14

9,10-dihydroxy-7-methylbenzo[b]quinolizinium bromide (a) 9,10-dimethoxy - 7 - methylbenzo[b]quinolizinium bromide.—1-(4,5-dimethoxy - 2 - methyl)benzyl-2-formylpyridinium bromide oxime (11.4 g.) was dissolved in 48% hydrobromic acid (29 ml.) previously heated to 110°, and the solution was maintained at that temperature for 5 minutes. The solution was poured into tetrahydrofuran (454 ml.) with stirring and the stirring was maintained for a further 18 hours. The resulting product (5.2 g.) was filtered off and used without purification for the next step of the synthesis.

(b) 9,10-dihydroxy - 7 - methylbenzo[b]quinolizinium bromide.—A mixture of 9,10-dimethoxy-7-methylbenzo[b]quinolizinium bromide (5.0 g.) and 48% hydrobromic acid (21 ml.) was refluxed for 3 hours, and the reaction mixture cooled to room temperature. The crystalline product was filtered off and recrystallized from dilute hydrobromic acid to give 3.50 g. of the pure material, M.P. >350°, as orange needles.

Analysis.—Calc'd for $C_{14}H_{12}BrNO_2$ (percent): C, 54.92; H, 3.95; N, 4.58; Br, 26.11. Found (percent): C, 55.00; H, 3.90; N, 4.60; Br, 25.98.

EXAMPLE 15

9,10-dihydroxy-7-methylbenzo[b]quinolizinium chloride (a) 9,10-dimethoxy - 7 - methylbenzo[b]quinolizinium chloride.—A mixture of 4,5-dimethoxy-2-methylbenzyl bromide (26.5 g.), pyridine-2-carboxaldehyde (12.5 g.) and dimethylformamide (1.5 ml.) was maintained at room temperature for 24 hours. The resulting glassy mass was triturated with ether and filtered off under nitrogen as an orange powder. This material was dissolved in concentrated hydrochloric acid (100 ml.) and the solution maintained at 100° for two hours. The reaction mixture was diluted to 1000 ml. and passed through a column of Dowex 21 K (chloride form). Evaporation of the eluant gave the product as a red glass (32.9 g.).

(b) 9,10-dihydroxy - 7 - methyl-benzo[b]quinolizinium chloride.—9,10-dimethoxy - 7 - methyl-benzo[b]quinolizinium chloride (32.5 g.) was dissolved in concentrated hydrochloric acid (230 ml.) and the solution was refluxed for 18 hours. The reaction mixture was cooled to room temperature and the resulting crystalline precipitate was filtered off and recrystallized once from dilute hydrochloric acid to give the pure product (7.2 g.) as orange needles, M.P. 342° dec.

Analysis.—Calc'd for $C_{14}H_{12}ClNO_2$ (percent) : C, 64.25; H, 4.62; N, 5.36; Cl, 13.55. Found (percent): C, 64.19; H, 4.69; N, 5.37; Cl, 13.50.

EXAMPLE 16

9,10-diacetoxy-7-methylbenzo[b]quinolizinium bromide

A mixture of 9,10 - dihydroxy - 7 - methylbenzo[b]quinolizinium bromide (5.0 g.), prepared according to the method of Example 14, acetic anhydride (40 ml.), and concentrated sulfuric acid (0.5 g.) was refluxed until all the solid had dissolved. The reaction mixture was cooled, the crystalline product filtered off and recrystallized four times from ethanol to yield 520 mg. of the pure diacetate as yellow crystals, M.P. 229–231° dec.

Analysis.—Calc'd for $C_{18}H_{16}BrNO_4$ (percent): C, 55.39; H, 4.14; N, 3.59; Br, 20.48. Found (percent): C, 55.16; H, 4.28; N, 3.70; Br, 20.25.

EXAMPLE 17

9,10-dipropionoxy-7-methylbenzo[b]quinolizinium bromide

A mixture of 9,10 - dihydroxy - 7 - methylbenzo[b]quinolizinium bromide (5.0 g.), prepared according to the method of Example 14 propionic anhydride (51 ml.) and concentrated sulfuric acid (0.5 g.) was refluxed until all the solid had dissolved. The reaction mixture was cooled, the crystalline product filtered off and recrystallized twice from ethanol to give 1.3 g. of the pure dipropionate as yellow crystals, M.P. 225–226°.

Analysis.—Calc'd for $C_{20}H_{20}BrNO_4$ (percent): C, 57.43; H, 4.82; N, 3.35; Br, 19.11. Found (percent): C, 57.56; H, 4.85; N, 3.42; Br, 19.06.

EXAMPLE 18

9,10-dihydroxy-7-isopropylbenzo[b]quinolizinium bromide (a) 3,4-dimethoxycumene.—4-isopropyl catechol (230 g.) was dissolved in a solution of sodium hydroxide (168 g.) in water (1210 ml.). The solution was cooled to 15° and dimethyl sulfate (325 ml.) was added to the stirred and cooled reaction mixture during 1½ hours. The mixture was warmed on the steam bath for one hour and refluxed for 18 hours. After cooling, the organic phase was separated and the aqueous phase extracted with benzene (2 x 250 ml.). The combined organic solutions were washed with 10% aqueous sodium hydroxide until no phenolic material remained (ferric chloride test) and then with water. The benzene was removed by distillation through a Vigreux column at atmospheric pressure, and the residue distilled under reduced pressure to yield a pale yellow liquid (223 g.), B.P. 123–130°/23 mm.

(b) 4,5 - dimethoxy - 2 - isopropylbenzyl bromide (Method A).—A mixture of 3,4-dimethoxycumene (41 g.), glacial acetic acid (38 g.), and monobromomethylmethyl ether (60 g.) was maintained at 30° for 5 hours. The reaction mixture was poured into ice-water, the resulting oil was extracted from the water with ether, the ether dried over anhydrous magnesium sulfate, and evaporated under reduced pressure to give the product as a pale yellow oil (54.7 g.), used without further purification for the next step of the synthesis.

(Method B).—A mixture of 3,4 - dimethoxy - cumene (60 g.), paraformaldehyde (11 g.), 48% hydrobromic acid (38 ml.), and benzene (166 ml.) was cooled to 0° with stirring and was saturated with hydrogen bromide with ice cooling. The organic phase was separated, dried over anhydrous magnesium sulfate, and the solvent removed under reduced pressure to give the crude benzylbromide (86 g.) used without purification for the next step of the synthesis.

(c) 1 - (4,5 - dimethoxy - 2 - isopropyl)benzyl - 2 - formylpyridinium bromide oxime.—4,5 - dimethoxy - 2 - isopropylbenzyl bromide (54.7 g.) and 2-pyridinealdoxime (20.9 g.) were dissolved in dimethylformamide (132 ml.) and the solution maintained at 30° for 18 hours. The reaction mixture was added slowly to ethyl acetate (3000 ml.) and the resulting amorphous product (64.2 g.) was filtered off and used without purification for the next step of the synthesis. One recrystallization from methanol/ethyl acetate gave the pure quaternary salt, M.P. 147–148° dec.

Analysis.—Calc'd for $C_{18}H_{23}BrN_2O_3$ (percent): C, 54.68; H, 5.86; N, 7.08; Br, 20.22. Found (percent): C, 54.06, 54.45, 54.35; H, 5.60, 5.67, 5.70; N, 6.91; Br, 20.72, 20.49.

(d) 9,10 - dimethoxy - 7 - isopropylbenzo[b]quinolizinium bromide.—1 - (4,5 - dimethoxy - 2 - isopropyl) benzyl- 2 - formylpyridinium bromide oxime (43.1 g.) was dissolved in 48% hydrobromic acid (100 ml.) previously heated to 110°. The solution was maintained at that temperature for 5 minutes, and then added slowly to tetrahydrofuran (4000 ml.) with stirring. The stirring was continued for a further 18 hours and the resulting crystalline product (17.4 g.) filtered off and used without purification for the next step of the synthesis.

(e) 9,10 - dihydroxy - 7 - isopropylbenzo[b]quinolizinium bromide.—A solution of 9,10 - dimethoxy - 7 - isopropylbenzo[b]quinolizinium bromide (10 g.) in 48% hydrobromic acid (40 ml.) was refluxed for 3 hours. The crystalline product was filtered from the hot reaction mixture and recrystallized three times from dilute hydrobromic acid to give 900 mg. of the pure salt as orange needles, M.P. >350°.

Analysis.—Calc'd for $C_{16}H_{16}BrNO_2$ (percent): C, 57.49; H, 4.83; N, 4.19; Br, 23.91. Found (percent): C, 57.36; H, 4.65; N, 4.24; Br, 23.63.

EXAMPLE 19

11-amino-8,9,10-trimethoxybenzo[b]quinolizinium bromide (a) 3,4,5 - trimethoxybenzyl bromide.—3,4,5 - trimethoxybenzyl alcohol (40.0 g.) was dissolved in dry benzene (312 ml.) and the solution was cooled to −10°, and saturated with hydrogen bromine with stirring. The reaction mixture was neutralized with anhydrous potassium carbonate, filtered, and dried over anhydrous magnesium sulfate. Evaporation of the solvent gave the bromide as an almost colorless oil (43.3 g.) used without purification for the next step of the synthesis.

(b) 1 - (3,4,5 - trimethoxy)benzyl - 2 - formylpyridinium bromide oxide.—3,4,5 - trimethoxybenzylbromine (43.0 g.) and 2-pyridinealdoxime (32.3 g.) were dissolved in dimethylformamide (203 ml.) and the resulting solution was maintained at 30° for 18 hours. The crystalline product was filtered off and the filtrate poured into ethyl acetate (2000 ml.) The resulting amorphous product was filtered off and combined with the crystalline material to give a total yield of 51.2 g. of the crude salt used without purification for the next step of the synthesis. Two recrystallizations from methanol gave the pure salt as colorless crystals, M.P. 155–157.5°.

Analysis.—Calc'd for $C_{16}H_{19}BrN_2O_4$ (percent): C, 50.14; H, 5.00; N, 7.32; Br, 20.85. Found (percent: C, 49.80; H, 4.80; N, 7.32; Br, 20.73.

(c) 11 - amino - 8,9,10 - trimethoxybenzo[b]quinolizinium bromide.—1 - (3,4,5 - trimethoxy)benzyl - 2-formylpyridinium bromide oxime (51.0 g.) was dissolved in 48% hydrobromic acid (128 ml.) heated on the steam bath. The resulting solution was poured into tetrahydrofuran (2500 ml.) with stirring and the stirring was maintained for 18 hours. The crystalline product (34.1 g.) was filtered off and recrystallized three times from ethanol to give 4.2 g. of the pure amino-compound as orange crystals, M.P. 223–223.5°.

Analysis.—Calc'd for $C_{16}H_{17}BrN_2O_3$ (percent): C, 52.61; H, 4.69; N, 7.67; Br, 21.88. Found (percent): C, 52.53; H, 4.90; N, 7.62; Br, 21.75.

EXAMPLE 20

8,9,10,11 - tetrahydroxybenzo[b]quinolizinium bromide

11 - amino - 8,9,10 - trimethoxybenzo[b]quinolizinium bromide (5.0 g.) prepared according to the method of Example 19, was dissolved in 48% hydrobromic acid (30 ml.) and the solution refluxed for 3 hours. The reaction mixtures was cooled to room temperature and the product removed by filtration. Two recrystallizations from dilute hydrobromic acid gave the desired product as a yellow amorphous solid, 1.93 g. M.P. >350°.

EXAMPLE 21

8,9,10-trihydroxybenzo[b]quinolizinium bromide (a) 8,9,10 - trimethoxybenzo[b]quinolizinium bromide.—1 - (3,4,5 - trimethoxy)benzyl - 2 - formylpyridinium bromide oxime (25 g. prepared according to the method given in Example 19 (b)) was dissolved in 48% hydrobromic acid (63 ml.) previously heated to 110°. The resulting solution was maintained at 110° for 5-minutes and then poured slowly with stirring into tetrahydrofuran (2500 ml.) Stirring was maintained for 18 hours and the precipitate was filtered off to give 12.7 g. of the crude salt, used without further purification for the next step of the synthesis.

(b) 8,9,10 - trihydroxybenzo[b]quinolizinium bromide.—A mixture of 8,9,10-trimethoxybenzo[b]quinolizinium bromide (10 g.) and 48% hydrobromic acid (42 ml.) was refluxed for 3 hours. The reaction mixture was cooled and the crystalline material filtered off and recrystallized from dilute hydrobromic acid to give 7.2 g. of the product as yellow crystalls, M.P. 350°.

Analysis.—Calc'd for $C_{13}H_{10}BrNO_3$ (percent): C, 50.67; H, 3.27; N, 4.55; Br 25.94. Found (percent): C, 50.67; H, 3.24; N, 4.59; Br 26.07.

EXAMPLE 22

11-amino-7,8-dimethoxybenzo[b]quinolizinium bromide (a) 2,3 - dimethoxybenzyl bromide.—2,3 - dimethoxybenzyl alcohol (75.0 g.) was dissolved in benzene (683 ml.) and the solution cooled to −10°. The solution was saturated with hydrogen bromide, neutralized with anhydrous potassium carbonate, filtered, and dried over anhydrous magnesium sulfate. Evaporation of the solvent gave the bromide as a colorless oil (90.3 g.) used without purification for the next step of the synthesis.

(b) 1 - (2,3 - dimethoxy)benzyl - 2 - formylpyridinium bromide oxime.—2,3 - dimethoxybenzyl bromide (90.3 g.) and 2-pyridinealdoxime (47.9 g.) were dissolved in dimethylformamide (63 ml.) and the resulting solution maintained at 30° for 18 hours. The crystalline product was filtered off and the filtrate poured into ethyl acetate (4000 ml.). The resulting amorphous precipitate was filtered off and combined with the crystalline material to give a total yield of 118.2 of the crude salt, used without purification for the next step of the synthesis.

(c) 11 - amino - 7,8 - dimethoxybenzo[b]quinolizinum bromide.—1 - (2,3 - dimethoxy)benzyl - 2-formylpyridinium bromide oxime (30.7 g.) was dissolved in 48% hydrobromic acid heated on the steam bath. The resulting solution was poured into tetrahydrofuran (1500 ml.) with stirring and the stirring maintained for 18 hours. Filtration yielded 19.3 g. of the crude product. Three recrystallizations from ethanol gave the pure material (1.2 g.) as orange crystals, M.P. 246–255°.

Analysis.—Calc'd for $C_{15}H_{15}BrN_2O_2$ (percent): C, 53.75 H, 4.51; N, 8.36; Br, 23.84. Found (percent): C, 54.02; H, 4.60; N, 8.64; Br, 23.70.

EXAMPLE 23

8,9-diethoxy-7-methylbenzo[b]quinolizinium bromide (a) 2,3 - diethoxytoluene.—3 - methylcatechol (250 g.) was dissolved in a solution of sodium hydroxide (224 g.) in water (1600 ml.) and the resulting solution was cooled with ice/salt. Diethyl sulfate (600 ml.) was slowly added with stirring, the temperature being maintained between 0° and −7°. The reaction mixture was heated on the steam bath for 3 hours, then refluxed for 18 hours and allowed to cool to room temperature. The organic layer was separated and the water layer was extracted thoroughly with benzene. The combined organic solutions were washed with 10% sodium hydroxide solution until no phenolic material remained (FeCl₃ test) and then with water. The benzene was distilled off at atmospheric pressure through a Vigreux column and the residue was distilled to give 219.4 g. of the product, B.P. 123–127°/12 mm.

(b) 3,4-diethoxy-2-methylbenzyl bromide.—A mixture of 2,3-diethoxytoluene (213 g.) benzene (590 ml.), paraformaldehyde (39.4 g.) and 48% hydrobromic acid (135 ml.) was cooled to 0° with stirring and saturated with hydrogen bromide. The organic phase was washed with saturated brine (3 x 150 ml.) dried over anhydrous magnesium sulfate and the solvent was removed under reduced pressure. The resulting oil was poured into ice-water (1000 ml.) and the crystalline product was filtered off and recrystallized from petroleum ether (B.P. 30–60°; charcoal) to give 154 g. of the benzyl bromide, M.P. 39–44°.

(c) 1-(3,4-diethoxy-2-methyl)benzyl - 2 - formylpyridinium bromide oxime.—A solution of 12.2 g. of 2-pyridinealdoxime and 27.3 g. of 3,4-diethoxy-2-methylbenzylbromide in 30 ml. of dimethylformamide was maintained at room temperature for four days. The resulting precipitate was filtered off and the filtrate poured slowly with stirring into 1000 ml. of ethyl acetate. The solid which was deposited was filtered off and combined with the material obtained directly from the reaction mixture. Recrystallization from 2B ethanol gave 8.5 g. of the pure product together with 10.3 g. of less pure material.

Analysis.—Calc'd for $C_{18}H_{23}BrN_2O_3$ (percent): C, 54.68; H, 5.86; N, 7.08; Br, 20.22. Found (percent): C, 54.57; H, 5.84; N, 7.14; Br, 20.46.

(d) 8,9 - diethoxy - 7 - methylbenzo[b]quinolizinium bromide.—1-(3,4-diethoxy-2-methyl)benzyl - 2 - formylpyridinium bromide oxime (5.5 g.) was dissolved in 48% hydrobromic acid (15 ml.) previously heated at 110°, and the solution was maintained at that temperature for 6 minutes. The solution was poured into tetrahydrofuran (200 ml.) with stirring. The resulting yellow precipitate was filtered off and recrystallized from methanol/isopropanol to give the benzo[b]quinolizinium salt (0.6 g.) as yellow crystals, M.P. 213–220° dec.

EXAMPLE 24

8,9-dimethoxy-3-ethyl-7-methylbenzo[b]quinolizinium bromide (a) 5 - ethyl - 2 - pyridinealdoxime.—A mixture of 5-ethyl-2-methylpyridine (24 g.), glacial acetic acid (80 ml.) and 30% hydrogen peroxide (18 ml.) was maintained at 80° for three hours. An additional portion of 30% hydrogen peroxide (6 ml.) was added and the mixture was maintained at 80° for a further 3-hour period. The volatile solvents were removed under reduced pressure (water pump) and the residue dissolved in acetic anhydride (50 ml.). The mixture was heated to 95°, which initiated an exothermic reaction. The reaction mixture refluxed and refluxing was maintained for a further 2 hours. The solution was distilled under reduced pressure (water pump) and after a forerun, 2 acetoxymethyl-5-ethyl-pyridine (15.0 g., B.P. 138–40°/12 mm.) was obtained.

A mixture of the 2-acetoxymethyl-5-ethylpyridine obtained above, glacial acetic acid (70 ml.), and 30% hydrogen peroxide (16 ml.) was maintained at 80° for 3 hours. An additional portion of 30% hydrogen peroxide (8 ml.) was added and the mixture was maintained at 80° for a further 3-hour period. The volatile solvents were removed under reduced pressure (water pump) and the residue was dissolved in 6N HCl (60 ml.). The solution was heated on the steam bath for one hour and the bulk of the hydrochloric acid was removed on the rotary evaporator. The residue was dissolved in water, made basic by the addition of aqueous sodium hydroxide, and extracted thoroughly with ether. The ether was removed on the rotary evaporator and the residue distilled to give 5-ethyl-2-formylpyridine (3.76 g.; B.P. 85–106°/12 mm.).

A solution of hydroxylamine was prepared from hydroxylamine hydrochloride (1.94 g.), water (10 ml.), and sodium bicarbonate (2.35 g.). A solution of the aldehyde obtained above in ethanol (10 ml.) was added and the mixture heated on the steam bath for one hour. The reaction mixture was cooled to room temperature, and 5-ethyl-2-pyridinealdoxime (2.99 g.: M.P. 148–9°) was obtained.

(b) 1-(3,4-dimethoxy - 2 - methyl)benzyl - 5 - ethyl-2-formylpyridinium bromide oxime.—A solution of 3,4-dimethoxy-2-methylbenzyl bromide (3.83 g.: prepared according to Method A given in Example 1 (b)) and 5-ethyl-2-pyridinealdoxime (2.34 g.) in dimethylformamide (10 ml.) was maintained at room temperature for 18 hours and poured slowly with stirring into ethyl acetate (200 ml.). The resulting solid (5.6 g.) was filtered off. A portion of this material (3.0 g.) was recrystallized from isopropanol to give the pure quaternary salt (1.2 g.: M.P. 142–143°) as colorless crystals.

Analysis.—Calc'd for $C_{18}H_{23}BrN_2O_3$ (percent): C, 54.68; H, 5.87; N, 7.09; Br, 20.21; Found (percent): C, 54.74; H, 5.93; N, 7.06; Br, 20.26.

(c) 8,9 - dimethoxy - 3 - ethyl - 7 - methylbenzo[b]-quinolizinium bromide.—1 - (3,4-dimethoxy-2-methyl)-benzyl-5-ethyl-2-formylpyridinium bromide oxime (2.1 g.) was dissolved in 48% hydrobromic acid (4.5 ml.) previously heated to 110°, and the solution was maintained at that temperature for five minutes. The solution was poured into tetrahydrofuran (70 ml.) with stirring. The resulting precipitate was filtered off and recrystallized from isopropanol to give the benzo[b]quinolizinium salt (0.8 g.) as yellow crystals, M.P. 162.5–167.5°.

EXAMPLE 25

8,9-dimethoxy-1,7-dimethylbenzo[b]quinolizinium bromide (a) 1-(3,4-dimethoxy - 2 - methyl)benzyl - 2 - formyl-3-methylpyridinium bromide oxime.—A solution of 3-methyl-2-pyridinealdoxime (6.8 g.: prepared by the method of S. Ginsburg and I. B. Wilson, J. Amer. Chem. Soc., 79, 481 (1957)) and 3,4-dimethoxy-2-methylbenzyl bromide (12.2 g.; prepared according to either method given in Example 1 (b)) in dimethylformamide (35 ml.) was maintained at room temperature for two hours. The precipitate was filtered off and recrystallized from ethanol to give the pure quaternary salt (7.0 g.) as colorless crystals, M.P. 154–155.5°.

Analysis.—Calc'd for $C_{17}H_{21}BrN_2O_3$ (percent): C, 53.55; H, 5.56; N, 7.35; Br, 20.96. Found (percent): C, 53.54; H, 5.55; N, 7.31; Br, 21.24.

(b) 8,9 - dimethoxy - 1,7 - dimethylbenzo[b]quinolizinium bromide.—1-(3,4-dimethoxy - 2 - methyl)benzyl-2-formyl-3-methylpyridinium bromide oxime (5.0 g.) was dissolved in 48% hydrobromic acid (13 ml.) previously heated to 110°, and the solution was maintained at that temperature for six minutes. The solution was poured into tetrahydrofuran (100 ml.) with stirring. The resulting precipitate was filtered off and recrystallized from methanol/isopropanol to give the benzo[b]quinolizinium salt (2.0 g.) as yellow crystals, M.P. 202–9°.

As noted above, the compounds of this invention have useful pharmacological effects. To illustrate the cardiovascular activity of these compounds, the following hypotensive effects were observed in Chloralose/urethane anaesthetized cats when the indicated compounds were administered intravenously:

TABLE I

| Compound | Dose, mg./kg. | Blood pressure Initial value | Blood pressure Drug-induced value | Duration of effect, minutes |
|---|---|---|---|---|
| 8,9-dimethoxy-7-methylbenzo[b]quinolizinium bromide | 10 | 140/75 | 80/43 | 3.0 |
| 8,9-dihydroxy-7-methylbenzo[b]quinolizinium bromide | 10 | 148/60 | 93/45 | 9.8 |
| 11-amino-8,9-dimethoxybenzo[b]quinolizinium bromide | 10 | 148/70 | 80/34 | 10.0 |
| 11-amino-8,9-10-trimethoxybenzo[b]quinolizinium bromide | 3 | 153/63 | 83/28 | 2.0 |

As indicated in the foregoing table, administration of the compounds of this invention causes a significant lowering of blood pressure (drug-induced value).

The antipyretic effects of these compounds were measured by administering certain of them interperitoneally to rats in doses of 50 milligrams per kilogram of body weight. Rectal temperature (in degrees F.) was measured at the time of administration and at 1, 2 and 3 hours after administration. The difference between the temperature at the 1-, 2-, and 3-hour intervals and the temperature at the time of administration were added to obtain the sum of the differences. The data are reported in Table II:

TABLE II

| Compound: | Sum of differences |
|---|---|
| 8,9-dimethoxy-7-methylbenzo[b]quinolizinium bromide | −15.2 |
| 8,9-dihydroxy-7-methylbenzo[b]quinolizinium bromide | −5.7 |
| 11-amino-8,9-dimethoxybenzo[b]quinolizinium bromide | −4.6 |
| 11-amino-8,9,10-trimethoxybenzo[b]quinolizinium bromide | −11.3 |
| Antipyrine | −2.7 |

As indicated in the foregoing table, the compounds of this invention significantly exceeded the well known antipyretic agent antipyrine in antipyretic effect.

As an illustration of the central nervous system activity of these compounds, 9,10-dihydroxy-7-methylbenzo[b]quinolizinium bromide when administered to gerbils at a dose range of 5 to 20 milligrams per kilogram of body weight interperitoneally in the Sidman Avoidance Procedure, elicited responses indicative of tranquilizing activity analagous to that produced by known tranquilizing agents such as chlorpromazine.

We claim:
1. A compound of the formula

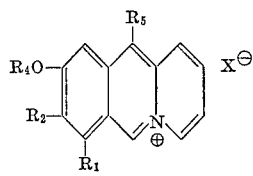

in which $R_1$ is hydrogen or lower alkyl,
$R_2$ is lower alkoxy or lower alkanoyloxy,
$R_4$ is lower alkyl or lower alkanoyl,
$R_5$ is hydrogen or amino, and
X is chlorine or bromine.

2. A compound according to claim 1 which is 8,9-diacetoxy-7-methylbenzo[b]quinolizinium bromide.
3. A compound according to claim 1 which is 11-amino-8,9-dimethoxybenzo[b]quinolizinium bromide.
4. A compound according to claim 1 which is 11-amino-8,9-dimethoxy-7-methylbenzo[b]quinolizinium bromide.
5. A compound of the formula

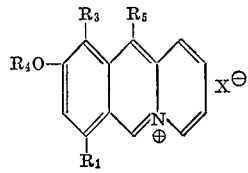

in which $R_1$ is lower alkyl,
$R_3$ is hydroxy, lower alkoxy, or lower alkanoyloxy,
$R_4$ is hydrogen, lower alkyl, or lower alkanoyl,
$R_5$ is hydrogen or amino, and
X is chlorine or bromine,
with the proviso that, if $R_3$ is hydroxy and $R_4$ is hydrogen, $R_5$ must be hydrogen.

6. A compound according to claim 5 which is 9,10-dihydroxy-7-methylbenzo[b]quinolizinium bromide.
7. A compound according to claim 5 which is 9,10-dihydroxy-7-isopropylbenzo[b]quinolizinium bromide.
8. A compound according to claim 5 which is 9,10-diacetoxy-7-methylbenzo[b]quinolizinium bromide.
9. A compound according to claim 8 which is 9,10-dipropionoxy-7-methylbenzo[b]quinolizinium bromide.
10. A compound of the formula

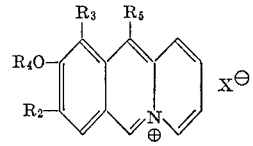

in which $R_2$ and $R_3$ are hydroxy or lower alkoxy,
$R_4$ is hydrogen or lower alkyl,
$R_5$ is hydrogen, hydroxy or amino, and
X is chlorine or bromine,
with the proviso that if $R_2$ and $R_3$ are hydroxy and $R_4$ is hydrogen, $R_5$ must be hydrogen or hydroxy.

11. A compound according to claim 10 which is 11-amino-8,9,10-trimethoxybenzo[b]quinolizinium bromide.

References Cited

UNITED STATES PATENTS

| 3,375,253 | 3/1968 | Fields et al. | 260—286 |
| 3,408,352 | 10/1968 | Hardtmann | 260—288 |
| 3,426,027 | 2/1969 | Muller | 260—289 |
| 3,489,759 | 1/1970 | Fields et al. | 260—289X |

OTHER REFERENCES

Thomas abstrated in Chem. Abstr., vol. 59, col. 6667 (1963).

Kupchan et al., Jour. Org. Chem., vol. 31, pp. 1707–12 (1966).

Bradsher et al.: Jour. Org. Chem., vol. 25, pp. 293–4 (1960).

Bradsher et al.: Jour. Org. Chem., vol. 25, pp. 294–5 (1960).

Bradsher et al.: Jour. Am. Chem. Soc., vol. 82, pp. 1145–7 (1960).

Sugimoto: abstrated in Chem. Abstr., vol. 45, col. 8535 (1951).

DONALD G. DAUS, Primary Examiner

U.S. Cl. X.R.

260—287, 288, 295, 296, 297, 479, 612; 424—258